(12) United States Patent
Tognazzini (10) Patent No.: US 7,133,836 B1
(45) Date of Patent: Nov. 7, 2006

(54) CATALOG PHONE SALES TERMINAL

(75) Inventor: Bruce Tognazzini, Woodside, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1570 days.

(21) Appl. No.: 08/655,136

(22) Filed: May 30, 1996

(51) Int. Cl.
*G06F 17/60* (2006.01)

(52) U.S. Cl. ............................. 705/26; 705/1; 705/14; 705/16

(58) Field of Classification Search ................ 705/26, 705/39, 41, 42, 44, 1, 50, 27, 14; 379/357.03
See application file for complete search history.

(56) References Cited

U.S. PATENT DOCUMENTS

| | | | | |
|---|---|---|---|---|
| 3,976,840 A | * | 8/1976 | Cleveland et al. | 379/93.02 |
| 4,625,276 A | * | 11/1986 | Benton et al. | 705/39 |
| 4,677,657 A | * | 6/1987 | Nagata et al. | 455/558 |
| 4,763,355 A | * | 8/1988 | Cox | 379/357.03 |
| 4,941,172 A | * | 7/1990 | Winebaum et al. | 379/357.03 |
| 5,195,130 A | * | 3/1993 | Weiss et al. | 379/98 |
| 5,343,519 A | * | 8/1994 | Feldman | 379/357.03 |
| 5,351,296 A | * | 9/1994 | Sullivan | 380/24 |
| 5,396,546 A | * | 3/1995 | Remillard | 379/93.24 |
| 5,452,352 A | * | 9/1995 | Talton | 379/355 |
| 5,455,407 A | * | 10/1995 | Rosen | 235/380 |
| 5,638,519 A | * | 6/1997 | Haluska | 705/28 |
| 5,714,741 A | * | 2/1998 | Pieterse et al. | 235/380 |
| 5,715,399 A | * | 2/1998 | Bezos | 705/27 |
| 5,717,923 A | * | 2/1998 | Dedrick | 707/102 |
| 5,727,163 A | * | 3/1998 | Bezos | 705/27 |
| 5,737,610 A | * | 4/1998 | Sandig et al. | 717/167 |
| 5,757,917 A | * | 5/1998 | Rose et al. | 705/79 |
| 5,826,166 A | * | 10/1998 | Brooks et al. | 725/134 |
| 6,125,388 A | | 9/2000 | Reisman | |
| 6,466,657 B1 | * | 10/2002 | Anvret et al. | 379/93.12 |

FOREIGN PATENT DOCUMENTS

EP 317496 A * 5/1989

OTHER PUBLICATIONS

"Telcos test screen phones for info services", Enhanced Services Outlook, v5, n6, Jun. 1992.*

* cited by examiner

*Primary Examiner*—Calvin Loyd Hewitt, II
(74) *Attorney, Agent, or Firm*—Finnegan, Henderson, Farabow, Garrett & Dunner, L.L.P.

(57) ABSTRACT

A telephone set is modified to permit it to automatically send repetitive data associated with telephone purchases. A retailer and a customer interact to ensure that accurate data is initially stored while eliminating the necessity of repeating the same information during subsequent purchases. A removable portable device stores the same information and permits a user to make purchases from any telephone.

4 Claims, 7 Drawing Sheets

CATALOG PHONE SALES TERMINAL

BACKGROUND OF THE INVENTION

1. Field of the Invention

The invention relates to the telecommunications, and more particularly to a telephone set modified to serve as a terminal for use in making telephone purchases.

2. Description of Related Art

When customers utilize a telephone to place orders from retailers, such as catalog or shopping channel companies, a significant portion of the customer's time is used to provide information that is not directly related to the item(s) they wish to purchase. With every order, the customer must provide or verify their name, address, phone number, credit card number and expiration date. Having to repeat this information with each order presents a significant disincentive to a potential customer's participation in phone-order shopping. Retailers incur added costs by having to gather such information verbally and repeatedly. Similarly, many non-retail transactions require consumers to provide portions of the same information or other information such as Social Security number, business phone number, and date of birth. In an era where improved customer satisfaction, increased efficiency and cost reduction are goals of both business and governments these systems are inappropriately wasteful.

Voice response systems have been developed to reduce a retailer's costs. These systems present a verbal menu of the options available with instructions as to which key on the telephone keypad to press to activate a particular option. In addition, some systems prompt users for relevant data (almost always numeric in nature) such as checking account number, credit card number, date of birth and Social Security number in order to provide the user with specific information about his account. These systems require the user to navigate long sequences of commands to retrieve or enter the necessary information. Sometimes, unclear instructions frustrate the user or the system does not have options the user wants. While some systems offer a menu choice which permits the user to speak with a person, that feature is often only available during business hours and is hence of limited usefulness.

Other voice response systems recognize very simple voice commands, but for other information, such as a user's name or address, the system merely records the information as it is spoken by the user for later transcription. The process of recording and transcription is inherently error-prone: the user may leave out critical information, the recordings may be of such poor quality that the information is effectively lost, or the transcription step itself may introduce errors and/or misinterpretations.

"Smart" cards are known which store a wide variety of information in digital format. Such cards incorporate memory, one or more microprocessors, software, and an interface to allow data transfer between the card and external devices.

Credit or debit cards are known for automated financial transactions. By using a digitally-encoded magnetic strip which contains the user's name, account number and a password, the user is afforded access to computer networks by having the card "read" by a machine. This technology is well-defined and standardized throughout the commercial world.

SUMMARY OF THE INVENTION

The present system provides apparatus, systems, processes and software which permits a user to transmit to retailers and others commonly requested information, including name, address, and credit card number. This is accomplished using a conventional telephone modified to contain memory, microprocessor, a simple display, such as a liquid crystal diode (LCD) display, an optional credit-card reader, a docketing port, and special keys if these are not already available. In addition, a removable unit, consisting of memory, microprocessor, special keys, battery and a speaker can be carried by the user to complete similar transmissions from any telephone.

After a retailer has verbally obtained the user's name and address and entered it into his system, the user is then requested to swipe his credit card through a built-in reader. This information is then transmitted to the retailer using, for example, a series of touch-tones. Once the user has verified all of the information, the retailer, in turn, transmits the information back to the user's telephone where it is stored in the telephone's memory. On subsequent occasions, either with the original retailer or other retailers, when name, address and credit-card information are requested by the retailer, the user simply presses a key that sends the stored information to the retailer. A date stamp, stored with the original retailer's loading of the user's telephone, allows one to determine the currency of the information and ask the user if any of the information has changed since the load date. If information has changed, it can be verbally given to the retailer, verified, and then re-loaded into the user's telephone.

The removable unit, while docked in the telephone, also receives initial and subsequent data transmissions. While traveling, the user may transmit the same information from the removable unit as from the main telephone unit by holding the removable unit's speaker next to any telephone's transmitter and pressing a key on the removable unit to initiate the data transfer.

The invention relates to customer telephone apparatus for sending information from a base station to called stations over a telephone line. A telephone set connected to the line, a data interface connected to the line, a card reader for reading card information and sending it to a called station over the data interface, a data memory for storing information from one of the called stations, including the card information, and a key for activating the data memory to send the stored information to another of the called stations implement the functionality. A docking port receives a portable device (removable unit) and uploads information from memory into the portable device. Both the customer base apparatus and the portable device optionally include displays for displaying information stored in memory.

The invention also relates to a portable device for sending information to called stations over a telephone line, including a device memory, a docking port for receiving information from an external memory and loading the information into the device memory, a converter for converting the information from the device memory into an audible representation of the information, and a send key for activating the converter. By activating the key, the audible representation is presented to a microphone of a telephone set for transmission to at least one of the called stations. The converter includes a digital to analog converter and an electro-acoustical transducer. The transfer of information from the customer base apparatus to the portable device and from the portable device to the acoustical output of the portable device is optionally password protected.

The invention is also directed to a method of sending information related to a telephone purchase from a customer to a seller, by storing information received from a seller in memory, and subsequently sending the information to a seller.

The invention is also directed to a method of sending information related to a telephone purchase from a seller to a customer, by capturing information provided by the customer in digital form and sending the information from the seller to the customer for storage. The seller checks to see if the customer is equipped with memory for storing the information, prior to sending the information.

The invention is also directed to a system for sending and receiving orders for goods, including a telephone at a customer site having a customer memory for storing and sending information, a telephone at a seller site having a seller memory and a display for respectively storing information provided by the customer. That information is keyed in by personnel at the seller site and stored in the seller memory. The information stored in the seller memory is sent to the customer site over telephone network connecting the telephone at a customer site with the telephone at a seller site while an order for goods is placed.

The invention is also directed to a computer program product for sending information related to a telephone purchase from a customer to a seller, including a memory medium, and a computer program stored on the memory medium. The computer program includes instructions for storing information received from a seller over a telephone line in memory and for subsequently sending the information to a seller.

The invention is also directed to a computer program product for sending information related to a telephone purchase from a seller to a customer, including a memory medium, and a computer program stored on the memory medium. The computer program includes instructions for recording information from the customer in digital form and sending the information from the seller to the customer for storage.

BRIEF DESCRIPTION OF DRAWINGS

The objects, features and advantages of the of the system of the present invention will be apparent from the following descriptions, in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
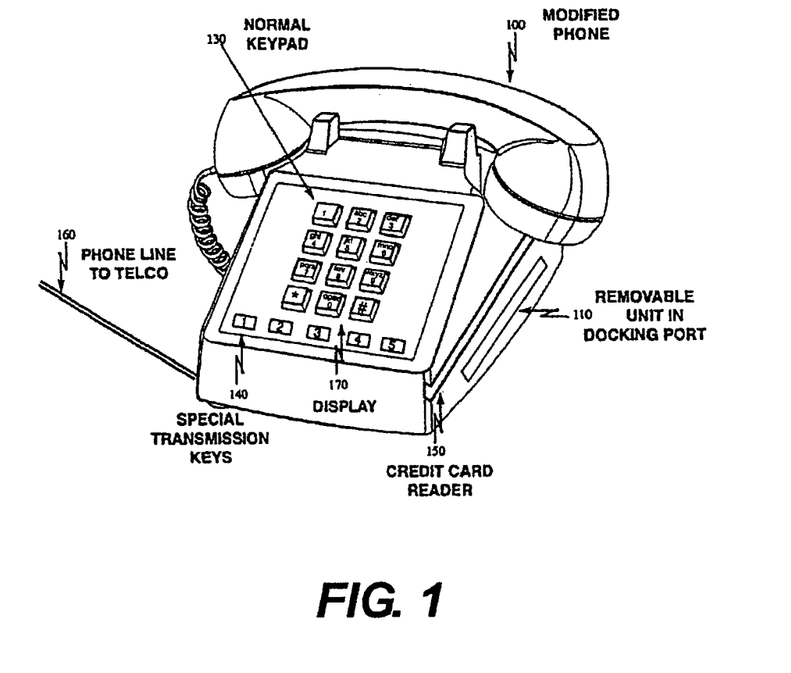
FIG. 1 illustrates a modified telephone set in accordance with the invention.

FIG. 1 illustrates a modified telephone set in accordance with the invention. It includes a telephone (100) with a standard keypad (130) and a wired connection to the local phone company (160). The telephone is modified over a standard telephone set to introduce a credit card reader (150) (for example, one in which a credit card is "swiped" over a read head), special transmission keys that the user will press to send specific information (140), a simple display, such as a liquid crystal display (LCD) panel (170) on which the user can review the information that a particular special key will send, and a removable unit, for portable use, shown in it's docking position (110). The number of special transmission keys (140) in FIG. 1 is for illustrative purposes only. These keys would have default labels that the user may change as desired. Exemplary default labels include: Name, Address, and Credit Card Number. Additional sets of keys and labels may be used to provide additional sets of similar information for other members of a household.

Figure 2:
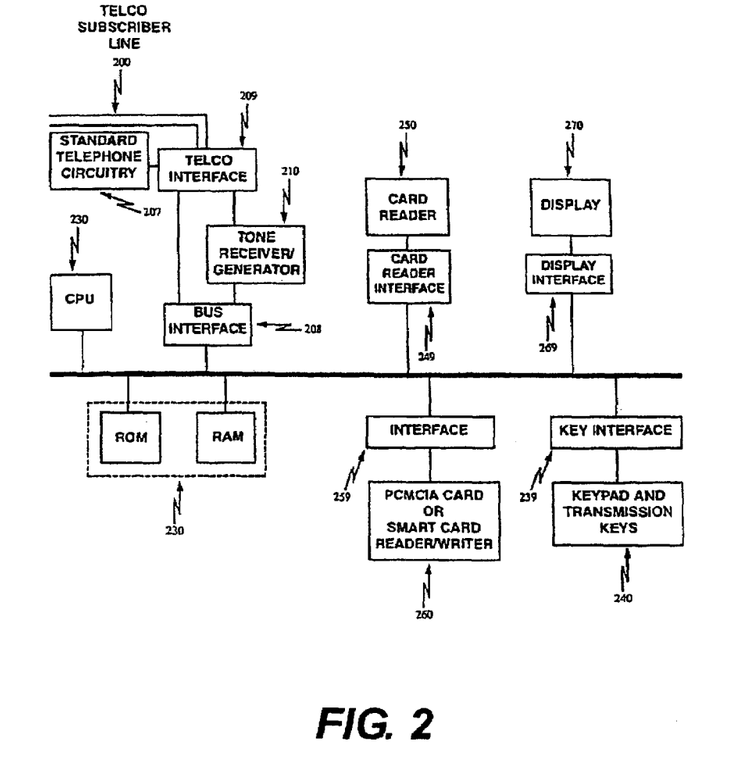
FIG. 2 is a block diagram of a modified telephone in accordance with the invention.

FIG. 2 is a block diagram of a modified telephone in accordance with the invention. The movement of data to and from the user's telephone is conducted across standard telephone wire pairs (200) that connect the device to the telephone company's central office and ultimately to the retailer. Tone generator/receiver (210) is connected to the bus over interface 208 and to the telephones lines 200 over interface 209. It is used to encode/decode data during transmission. The modified telephone allows a variety of transmission schemes, including a defined set of key-pad tone sequences to handle alphabetic data, or the use of standard modem tones to transmit data in ASCII format, to be implemented.

The microprocessor (220) performs various functions in the invention. It takes the incoming data and ensures that it is in a format suitable for permanent storage in memory (230). It retrieves from memory, data to send and forwards it to the tone generator 210. It communicates with the microprocessor of the removable unit (260), allowing the replication of data from the stationary unit's memory to the removable unit's memory. It identifies that a transmission key (240) has been pressed, retrieves the associated information from the memory unit, displays the information on the LCD panel (270) and/or sends the information to the tone generator for transmission. It also controls the credit card reader (270) and either places the information from it into memory for later retrieval or forwards it directly to the vendor. The power necessary to perform these functions is optionally provided by the telephone lines.

A retailer uses a similar system to that shown in FIG. 2, except a full keyboard would be available to take orders and a large screen display would be used. There would also be no need for a card reader or reader/writer.

Figure 3A:
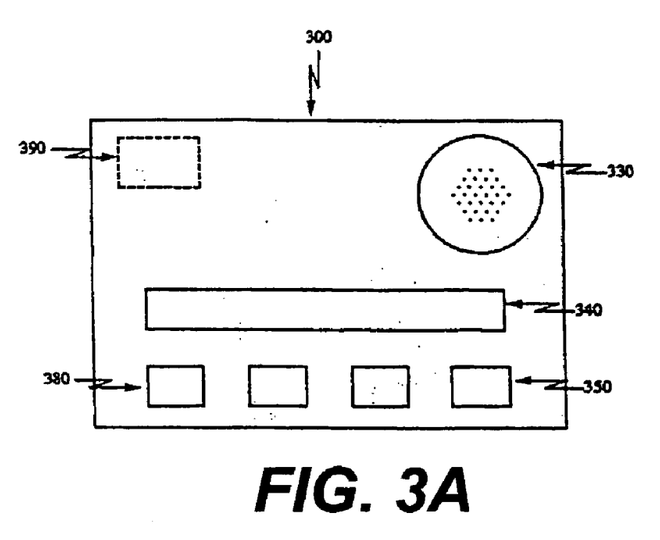
FIG. 3A illustrates the overall external appearance of a removable transmission device.
Figure 3B:
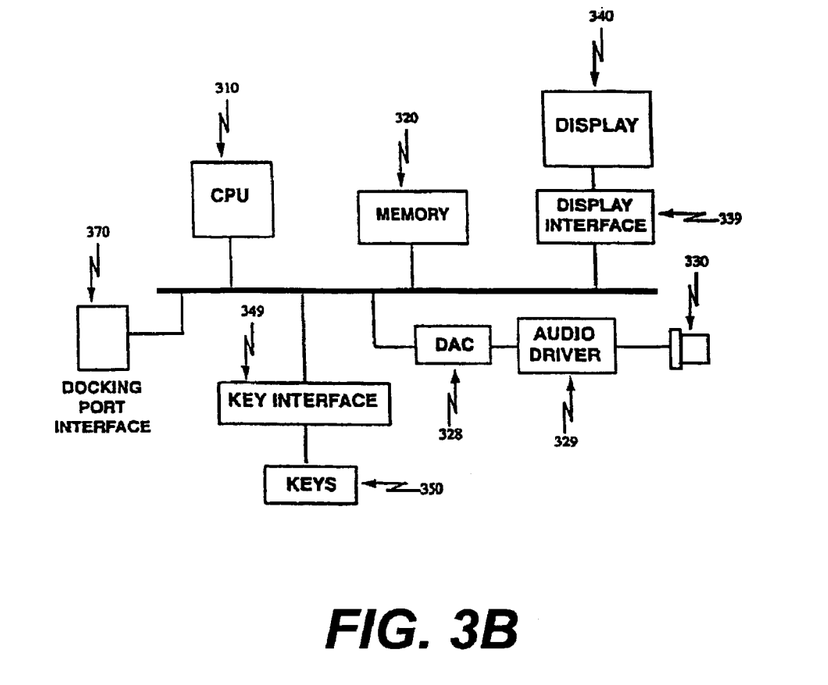
FIG. 3B is a block diagram of a portable device in accordance with the invention.

FIG. 3A illustrates the exterior of a removable transmission device which was shown in FIG. 1 installed in its docking port. The movement of data to the device from the user's telephone is conducted via the docking port's interface (370). The loading of the removable device is preferably password protected. Similarly, use of the removable device is preferably password protected. A tone generator is preferably implemented in software, although it could be a dedicated circuit. This generator allows a variety of transmission schemes, including a defined set of key-pad tone sequences to handle alphabetic data, or the use of standard modem tones to transmit data in ASCII format. As shown in FIG. 3B, regardless of transmission scheme, the data is routed to the speaker (330) via digital analog converter (DAC) 328 and optional audio driver which, when held to the telephone hand-set transmitter and activated by pressing a "send" key (380), produces a series of audible tones for transmission via normal telephone lines to the retailer.

The presence of a "send key" in both the modified telephone set and in the portable device, allows the user to select certain data using one or more keys, preview the data on an optional display and then send the data by activating the "send key". The user then positions the device's speaker near the microphone of a telephone set before pressing the send key to begin transmitting. An internal power supply (390), recharged when the unit is docked with the stationary device, provides the necessary power. The microprocessor (310) performs various functions in the portable device. First, it transforms the incoming data from the docking station interface (370), if needed, into a format suitable for permanent storage in the invention's memory (320). It retrieves from the memory data to send, displays it and forwards data to the tone generator (340). It identifies that the transmission key (360) has been pressed and retrieves the associated information from the memory unit either to display the information on the display (350) or, if it senses that the "send" key (380) has been pressed, sends the information to the tone generator for transmission to the speaker (330).

Figure 4:
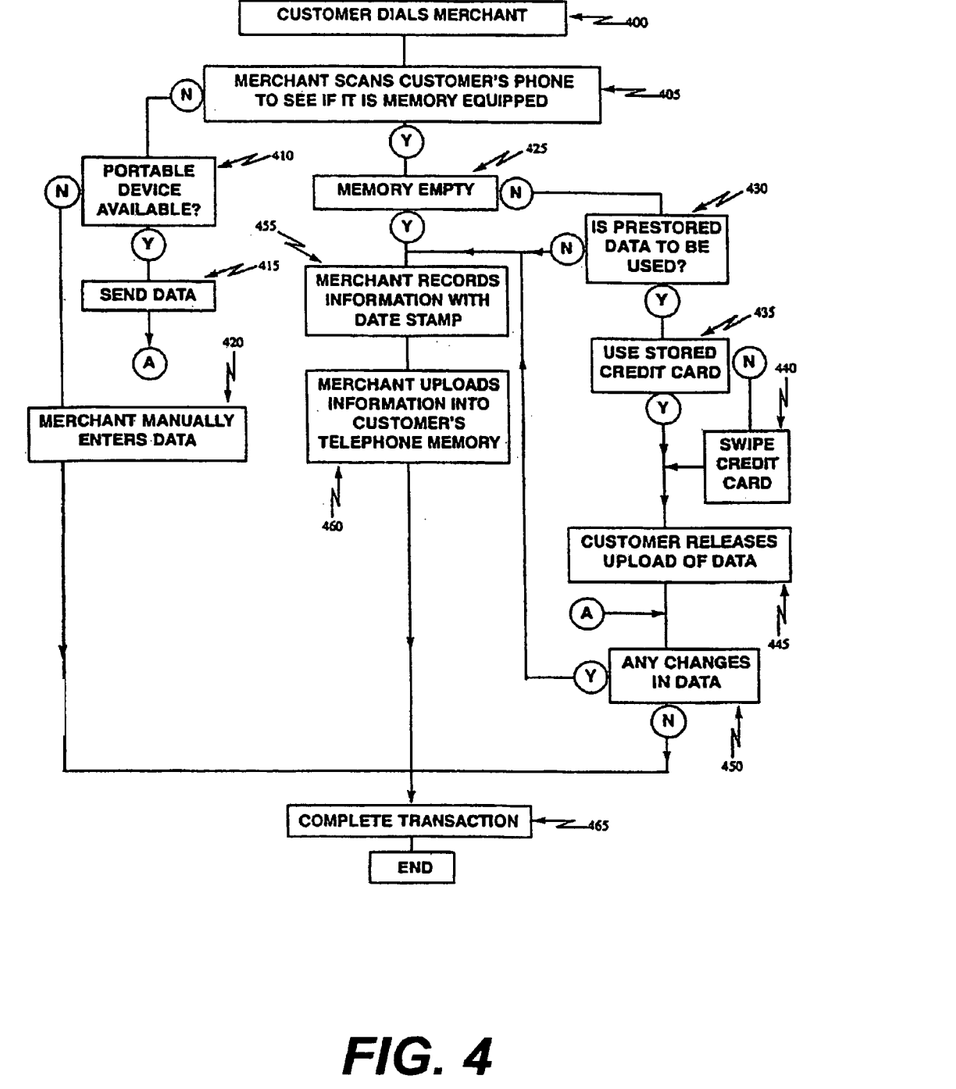
FIG. 4 is a flowchart of an exemplary process of the invention in use.

FIG. 4 is a flow chart of an exemplary process for using the invention. A customer dials a merchant (400) and identifies the item(s) to be purchased. The merchant scans a customer's telephone to see if it is of a type which is memory equipped (405) using a simple interrogation response protocol. If it is not, (405-N) the merchant asks if a portable device is available (410). If it is (410-Y) the data is sent, using the portable device, to the merchant and the process continues at point A (at block 450 at the right hand side of FIG. 4). If the portable device is not available (410-N), the merchant manually enters the data (420) as is done in the prior art. If a customer's phone is memory equipped (405-Y) and if the memory is empty (425-Y), the merchant records the information, provides a date stamp (455) and uploads the information into the customer's telephone memory (460). Optionally, the date stamp may be applied by the user rather than by the merchant. If the memory is not empty (425-N) the merchant inquires if pre-stored data is to be used. If it is not (430-N), the merchant records information provided by the customer and provides it with a date stamp as discussed in connection with the "Y" branch of block 425. If pre-stored data is to be used, and a stored credit card number is to be used (435-Y), the customer initiates the upload of data (445). The merchant inquires if there have been any changes in the data (450-Y) and the process continues at the 425-Y branch of the process. If no changes are required to the data, the merchant completes the transaction (465) and the process ends. If the stored credit card information is incorrect, such as when a card has expired and been replaced with a new one, (435-N), the user will swipe the credit card through the credit card reader (440) and the process will continue at block 445.

In this way, a customer can utilize stored information in the modified telephone to place an order, can use a portable device to place an order, and can readily change credit card information without any possibility of a transcription error.

Figure 5:
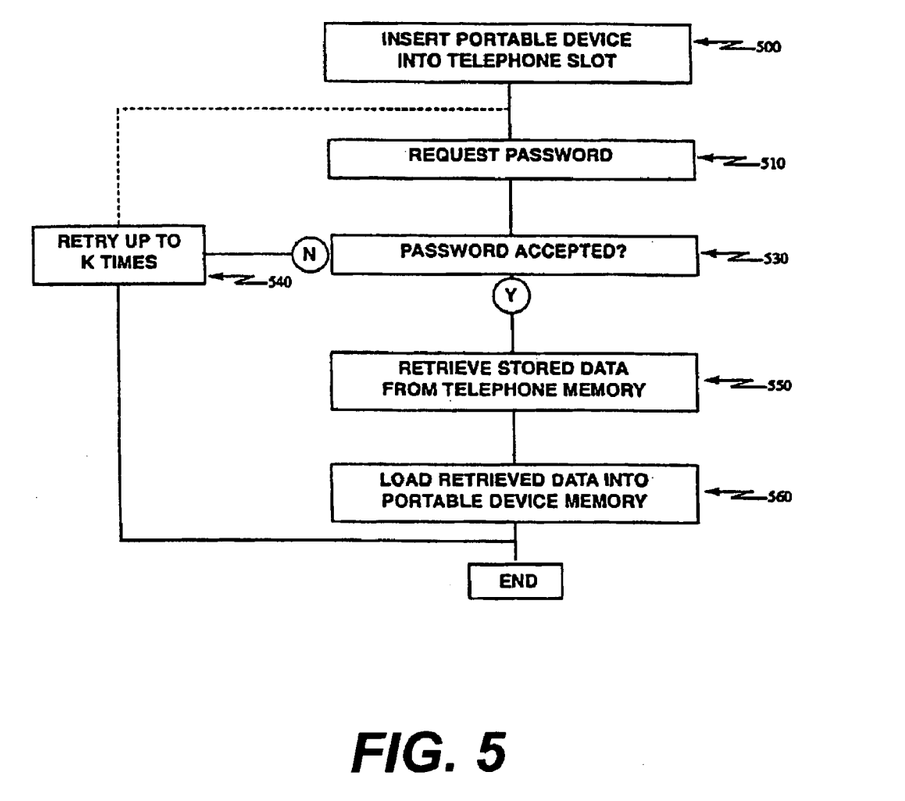
FIG. 5 is a flowchart of a process for loading information into a portable device.

FIG. 5 is a flow chart of a process for loading information into the portable device. The portable device is inserted into the telephone docking port (500) and a pass word is requested (510). The pass word is entered and if it is accepted (530-Y) stored data is retrieved from the telephone memory (550) and loaded into the portable device memory (560). If the pass word is not accepted, (530-N) a user may retry up to K times (540) after which the card will be disabled for a certain period of time.

Figure 6:
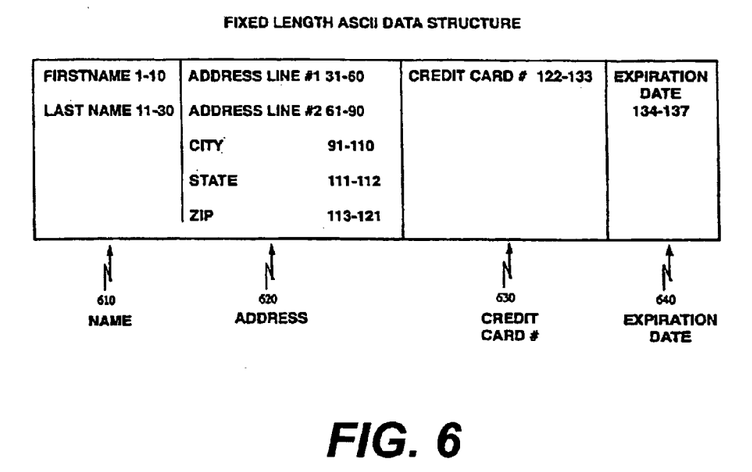
FIG. 6 illustrates an exemplary data structure for information transmission.

FIG. 6 illustrates an exemplary one of many possible data structures for data transmission. This ASCII structure is of fixed length and data elements are position dependent. Name (610), Address (620), Credit Card Number (630), and Credit Card Expiration Date (640) are shown with their starting and ending positions.

This invention solves many problems with the prior art. For example, the user is in contact with another person during those phases of the transaction (selection of color, size, shipping method etc.) where human interaction is important and efficient, unlike automated voice response systems. The collection and transmission of repetitive data (name, address, credit-card number) is automated, avoiding transcription errors of a recording automated response system. By utilizing a credit-card reader, a device familiar to most consumers, accuracy and security are enhanced since the numbers will be transmitted correctly and, by design, the first time the telephone device is used the user must have the credit-card in his possession. In addition, the removable unit avoids the complexities of smart card technology by utilizing widely known and readily available transmission technology, thus obviating the need for sophisticated external devices.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for sending information to called stations over a telephone line, comprising:
   a. a telephone set connected to said line;
   b. a data interface connected to said line;
   c. a card reader for reading card information and sending it to one of said called stations over said data interface;
   d. data memory for storing information from one of said called stations, including said card information;
   e. a key for activating said data memory to send said stored information to another of said called stations; and
   f. a docking port for receiving a portable device having device memory therein and for transferring information from said data memory to said device memory.

2. A system for sending and receiving orders for goods, comprising:
   a. a telephone at a customer site having a customer memory for storing and sending information;
   b. a telephone at a seller site having a seller memory and a display for respectively storing information, provided by said customer and keyed in by personnel at said seller site and stored in said seller memory, confirming whether a telephone of said customer is memory equipped, and sending information stored in said seller memory to said customer memory for use during a subsequent order; and
   c. a telephone network connecting said telephone at a customer site with said telephone at a seller site while an order for goods is placed.

3. A method for sending information from an apparatus to called stations over a telephone line, comprising:
   connecting a telephone set of the apparatus to said line;
   connecting a data interface of the apparatus to said line;
   reading, by a card reader of the apparatus, card information;
   sending, by the card reader, said card information to one of said called stations over said data interface;
   storing, in a data memory of the apparatus, information from one of said called stations, including said card information;
   activating, by a key of the apparatus, said data memory to send said stored information to another of said called stations;
   receiving, by a docking port of the apparatus, a portable device having device memory therein; and
   transferring, by the docking port, information from said data memory to said device memory.

4. A method for sending and receiving orders for goods, comprising:
   providing a telephone having a customer memory at a customer site for storing and sending information;
   storing, in a seller memory of a telephone at a seller site, information provided by said customer and keyed in by personnel at said seller site;
   confirming, on a display of the telephone at the seller site, whether a telephone of said customer is memory equipped;
   sending information stored in said seller memory from said telephone at the seller site to said customer memory for use during a subsequent order; and
   connecting, by a telephone network, said telephone at a customer site with said telephone at a seller site while an order for goods is placed.

* * * * *